Figure 1:
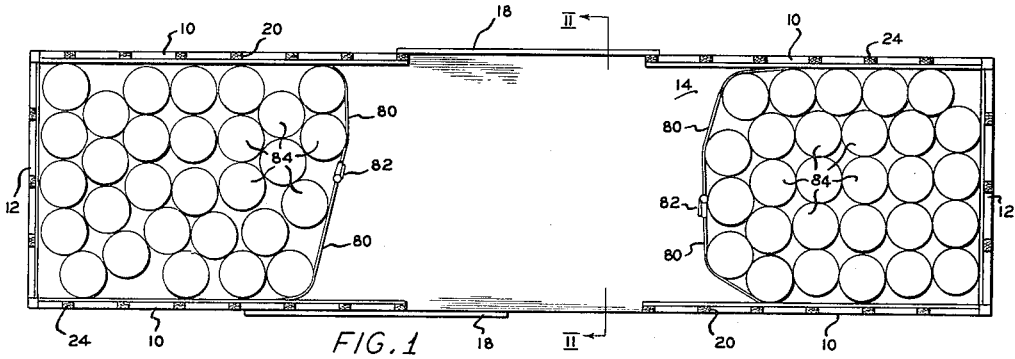

Dec. 21, 1965  E. C. ELSNER  3,224,385
SECURING DEVICE FOR CARGO TIE-DOWN MEANS
Filed Jan. 18, 1963  2 Sheets-Sheet 1

INVENTOR
EDWIN C. ELSNER
BY
his ATTORNEY

Dec. 21, 1965  E. C. ELSNER  3,224,385
SECURING DEVICE FOR CARGO TIE-DOWN MEANS
Filed Jan. 18, 1963  2 Sheets-Sheet 2
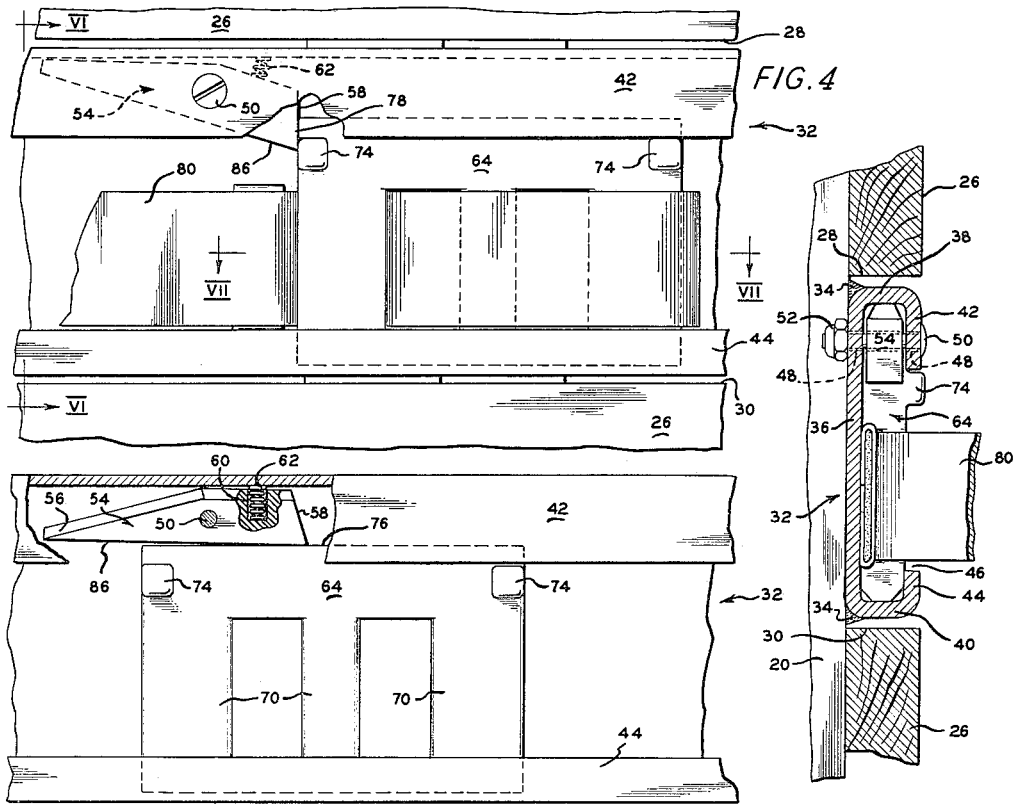
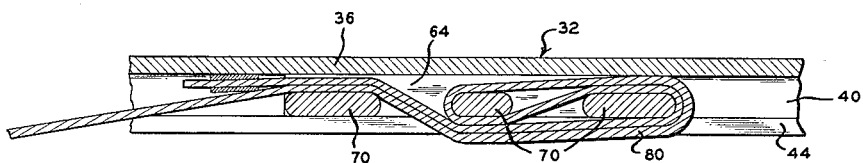
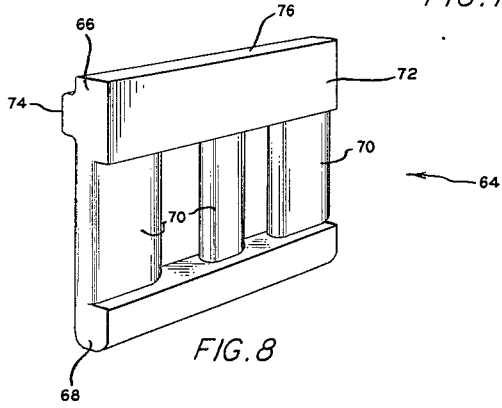
INVENTOR
EDWIN C. ELSNER
BY
ATTORNEY

United States Patent Office 3,224,385
Patented Dec. 21, 1965

3,224,385
SECURING DEVICE FOR CARGO TIE-DOWN MEANS
Edwin C. Elsner, Glendale, Calif., assignor to Aeroquip Corporation, Jackson, Mich.
Filed Jan. 18, 1963, Ser. No. 252,379
3 Claims. (Cl. 105—369)

The invention pertains to a cargo control system, and particularly relates to a dunnage-type system applicable with boxcars, trucks, boats, aircraft, and other cargo-carrying vehicles in which dunnage systems are employed.

Cargo control or dunnage systems are usually employed in conjunction with cargo spaces defined by opposed side walls interconnected by an end wall. The dunnage equipment is usually interposed between the side walls and in engagement with the unconfined vertical portion of the load. Rigid dunnage bars and elements have been employed to restrict movement of the load, and such rigid members are often axially adjustable to compensate for various widths of cargo areas and the flexing of the cargo space-defining walls, as frequently occurs in railroad and truck installations.

In accord with the invention, the dunnage cargo control system employs at least one track on each of the opposed side walls of a cargo space. These tracks are preferably horizontally related in a parallel relation, and located the same distance from the floor of the cargo space. A flexible tension member anchor means is located in each track, and serves as the anchor for one end of a flexible tension-transmitting member which is interposed between the tracks in engagement with the load to maintain a biasing force upon the load in the direction of the end wall. The track-supported anchor means may be readily positioned within the associated track whereby the dunnage system may be very quickly adjusted to any particular size and type of load or cargo. An important aspect of the invention lies in the ability of the anchor means to be located closer to the cargo space end wall than the cargo engaged by the tension member wherein the force imposed by the tension member actually "pulls" the load toward the end wall and, thus, transverse flexing of the side walls does not adversely affect the cargo control system.

It is, therefore, an object of the invention to provide a relatively inexpensive cargo control system which may be readily installed in existing cargo carriers, and wherein the cargo control system is easily adjustable to various sizes and types of cargo and loads.

A further object of the invention is to provide a cargo control system employing flexible tension members and tension member anchors wherein the tension member anchors may be positioned either before or after the cargo is positioned in the cargo space.

Another object of the invention is to provide a cargo control system for use with cargo spaces having opposed side walls and an end wall wherein the system employs flexible tension members and anchors therefor wherein the anchors may be positioned relative to the end wall either before or after loading of the cargo space in such a manner that the tension members "pull" the cargo toward the end wall.

Another object of the invention is to provide a cargo control system of economical manufacture which is of relatively light weight, and may be readily operated by one man.

Figure 2:
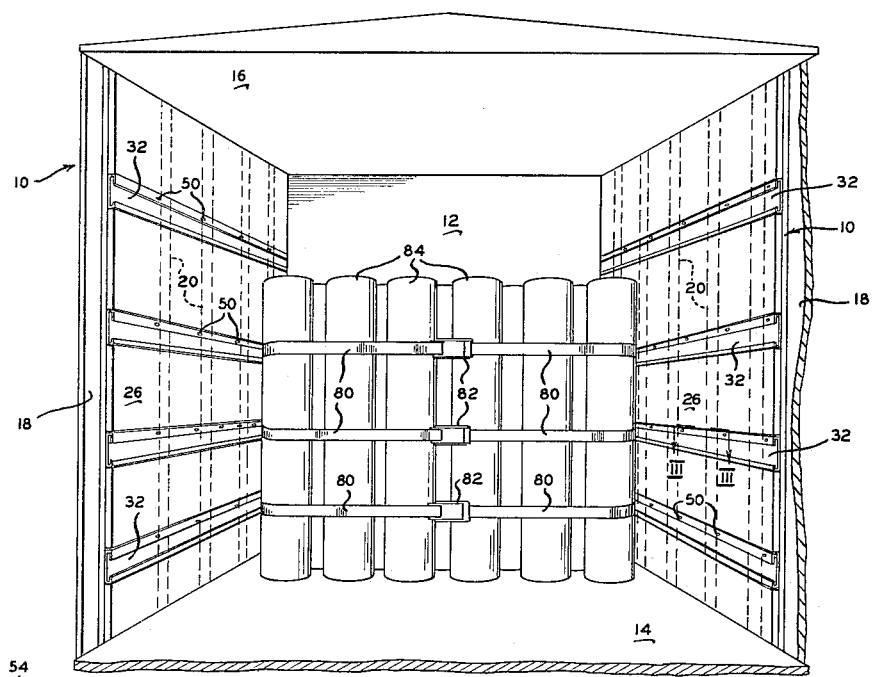
Figure 3:
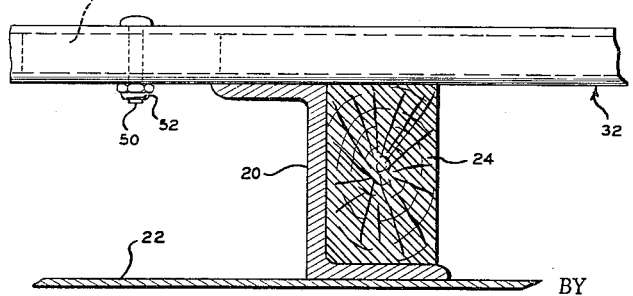

These and other objects of the invention arising from the details and relationships of the components of an embodiment thereof will be apparent from the following description and accompanying drawings wherein:

FIG. 1 is a plan, sectional view of a railroad boxcar employing a cargo control system in accord with the invention, FIG. 2 is an elevational, perspective view of the boxcar of FIG. 1 taken along section II—II thereof, FIG. 3 is a plan, enlarged detail, sectional view of a boxcar vertical column and a track associated therewith in accord with the invention taken along section III—III of FIG. 2.

FIG. 4 is an elevational, enlarged detail view of the track and tension member anchor slide shown in the locked or abutment engaging position, FIG. 5 is an elevational view of the track and slide, with the tension member removed therefrom, partly in section, illustrating the position of the abutment in the "by-pass" position, FIG. 6 is an elevational, sectional view taken along section VI—VI of FIG. 4, FIG. 7 is a plan, enlarged, detail, sectional view of the anchor slide taken along section VII—VII of FIG. 4, and FIG. 8 is a rear perspective view of the tension member anchor slide without a tension member attached.

For the purpose of illustration, the invention will be disclosed as employed in a typical railroad boxcar installation, and it will be appreciated that the invention will be employed in other types of vehicle cargo carriers in a similar manner.

In FIGS. 1 through 3, a typical boxcar construction is illustrated wherein the cargo space is defined by a pair of parallel, vertical, opposed side walls 10 interconnected at their ends by end walls 12. The cargo space is also defined by the boxcar floor 14, a roof 16, and a pair of doors 18. In the typical boxcar construction, the framework includes a plurality of vertically extending, parallel spaced Z-columns or angles 20, FIG. 3, which extend from the lower portion of the boxcar frame supporting the floor 14 to the roof 16. The outer skin 22 of the boxcar is attached to the columns 20, and it is common practice to bolt wood, nailing members 24 to the columns 20 which extend the height thereof whereby plywood inner walls 26 may be nailed to the members 24.

In the installation of a cargo system, in accord with the invention, in an existing conventional boxcar construction, horizontal strips of the inner wall plywood walls 26 are removed by a sawing operation to form an elongated opening defined by wall edges 28 and 30, FIG. 6. In the installation of FIG. 2, four such strips are removed from each of the side walls 10. After the horizontal strips of plywood have been removed from the boxcar side walls, track members 32 are placed within the elongated wall openings defined by the edges 28 and 30, and are welded, usually by an arc weld, to the columns as at 34, FIG. 6.

The cross-sectional configuration of the tracks 32 is best appreciated from FIG. 6 wherein the tracks are of a C-configuration, including a planar back portion 36, upper and lower base portions 38 and 40, respectively, and portions 42 and 44 depending from the portions 38 and 40, respectively, disposed parallel to back portion 36. The portions 42 and 44 are of limited vertical dimension whereby an elongated opening 46 is defined throughout the length of the track members 32. It will be appreciated that the vertical dimension of the portion 42 is greater than that of the portion 44, for reasons which will be apparent later.

A plurality of aligned holes 48 are defined in the track portions 36 and 42, usually at equally spaced locations relative to the track axial length, for the reception of an abutment lever pivot bolt or pin 50. In the illustrated embodiment, the pivot pin 50 in is the form of a bolt having a head and a threaded portion to which nut 52 is affixed. An abutment lever 54 is pivotally mounted upon the bolt 50, and is of such width as to be received between the track member portions 36 and 42, and includes a positioning portion 56 and an abutment surface 58. A blind hole 60 is defined in the abutment lever 54 for receiving a coil compression spring 62 which projects from the hold 60 and engages the underside of the track member portion 38. Thus, the biasing action of the spring 62 tends to bias the abutment lever 54 to the operative position shown in FIG. 4, wherein clockwise rotation of the lever is limited by engagement of the end of the positioning portion 56 with the track portion 38. Each track will, therefore, have a plurality of levers 54 located therein spaced apart every eighteen or twenty-four inches, for instance.

It will be noted from FIG. 6 that the width of the track members 32 is substantially equal to the thickness of the plywood inner walls 26. Therefore, the track members do not extend into the cargo space itself, are protected from the cargo, and do not occupy valuable cargo-holding space.

A tension member anchor slide 64 is located within each track 32. This slide is of a rectangular configuration, see FIGS. 4, 5, and 8, and may be of a cast construction. The slide 64 includes an upper rectangular portion 66 and a lower portion 68. Parallel, spaced columns or fingers 70 extend between the upper and lower portions 66 and 68, and are so spaced as to permit the tension member to be interwoven therethrough, as shown in FIG. 7. The fingers 70 are provided with rounded edges to prevent chafing of the tension member. It will be appreciated from FIG. 8 that the fingers 70 are set inwardly with respect to the slide surface 72 to provide clearance for the tension member between fingers 70 and track portion 36. The upper portion 66 of the slide 64 is received between the track portions 36 and 42, and the lower portion 68 is received between the recess defined by the track portions 36 and 44. The dimensions of the slide are such as to have a free-sliding relationship within the track. A pair of protrusions 74 is defined upon the inner surface of the slide 64, and extends into the track opening 46 slightly below the terminating edge of the portion 42 to vertically locate the slide within the track, and maintain the spacing between the upper surface 76 of the slide and the underside of the track portion 38.

It will be appreciated that when the abutment lever 54 is in its normal position, i.e., being biased to the maximum clockwise position shown in FIG. 4, a substantial part of the abutment surface 58 will be located within the path of the slide 64 and engage an end edge of the slide at 78 when the tension member is under tension. Upon pivoting the abutment lever 54 in the counterclockwise direction to the position shown in FIG. 5, the abutment surface 58 will be removed from the path of the slide, and the slide may be moved to the left past the abutment lever.

The tension members are preferably in the form of woven fabric web straps 80 of a flexible nature capable of withstanding high tensile forces. The straps 80 may be woven of nylon filaments, for instance. One end of each strap is affixed to an anchor slide 64 by an interwoven relationship with slide fingers 70, such as shown in FIG. 7, for example. The other end of the straps is associated with a buckle or take-up member, generally indicated at 82 in FIGS. 1 and 2. The take-up members 82 may be of any conventional nature which will accomplish the purpose of tensioning the web straps 80 associated with the opposed tracks. By way of example, the web-tensioning buckle illustrated in United States Patent No. 2,874,431 may be employed for this purpose. Thus, the end of the strap 80 not attached to the slide 64 is affixed to the buckle 82, and at least one of the straps 80 is removably attached to the buckles, whereby the two straps constituting a tension member may be disconnected when the cargo control system is not in use.

The operation and use of the cargo control system, in accord with the invention, will now be described.

Assuming the cargo space defined by the side walls 10, end walls 12, floor 14, and roof 16 to be empty of cargo, the straps 80 of opposing tracks and slides will not be connected by the tensioning take-up means 82, and one of the straps would be disconnected from the take-up means. The straps 80, in the inoperative or nonuse condition, are preferably laid into the associated track. The straps may be positioned within the associated track 32 in that the vertical height of the track opening 46 is substantially greater than the vertical height of the strap and the track portions 36, 40, and 44 of the track define a trough for receiving the strap. Thus, the straps may be stored out of the way and, as the track members 32 are located within the configuration of the side walls 10, the dunnage control system of the invention offers no hindrance to loading of the cargo space.

For the purpose of illustration, a cargo of elongated, cylindrical articles 84 is shown, and these members are located upon their ends in contiguous relation between the side walls 10 and the end walls 12. Usually, prior to loading the cargo space, the operator will be able to estimate how much of the floor area will be occupied by the cargo, and will locate the anchor slides 64 at a position in engagement with the abutment surface 58 of a lever 54 within their tracks intermediate the end wall and the cargo article located the greatest distance from the end wall. After the cargo articles 84 are loaded as desired, the straps 80 within opposed tracks 32 are removed from the associated track, and the strap end not permanently affixed to the tension member 82 is attached thereto, and the tension member is operated to create a tension in the straps 80 associated therewith. The tension within the straps 80 will impose a force upon the articles 84 in the direction of the end wall 12 in that the straps will be in direct engagement with the articles furthest from the end wall, and the anchor slides 64 are interposed between the end wall and the cargo articles engaged by the straps 80. As the portion of the straps adjacent the anchor slides 64 will be substantially perpendicular to the end walls, this relationship will cause a "pulling" action upon the articles 84. This type of "pulling" action permits a very firm force to be imposed upon the cargo articles, and prevents outward deflection of the side walls due to "humping" of the boxcar, or other impacts, from adversely affecting the efficiency of the cargo control system.

Usually, a plurality of tracks 32 will be located on each side wall 10, one track on each side wall being in an opposed relation with a track on the opposite side wall. Four track sets are shown in FIG. 2. However, a fewer number or a greater number of track sets may be used in a given installation.

Removal of the cargo control system from its operative condition, as shown in FIGS. 1, 2, 4, 6, and 7 is easily accomplished by releasing the tensioning member 82 to remove the tension within the straps 80 and permit the straps to be separated and again laid into the associated track in an "out-of-the-way" position, or merely dropped to the floor adjacent the side walls.

If the loading operator does not desire to preposition the anchor slides 64, the slides may be moved to a remote position, relative to the associated end wall 12, by rotating the lever 54 in the counterclockwise direction to permit the slide 64 to be moved to the left under the abutment lever, FIG. 5. In this regard, it is to be appreciated that the abutment surface 58 faces the end wall 12 and that movement of the slides 64 during tensioning of the straps 80 is prevented due to the engagement of the slide with an abutment lever. Upon the levers 54 being pivoted to the "by-pass" position of FIG. 5, the slides 64 may be moved to any position desired within the associated track. With the slides 64 at a remote location from the end wall 12, usually adjacent the boxcar doors 18, the cargo space is then loaded. After loading is completed, the operator positions the slides 64 as desired. This operation consists of merely sliding the slides 64 toward the end wall 12. Upon engagement of the end of the slide nearest the end wall with an abutment lever 54, the inclined relationship of the abutment lever surface 86 will cause the lever 54 to pivot out of an interfering relationship with the slide and pivot the abutment lever to the position of FIG. 5, allowing the slide to be pushed unhindered toward the end wall. To locate the slides 64 intermediate the end wall and the portion of the load engaged by the straps 80, the operator may employ a push rod or stick which is small enough to be received within the track opening 46. One end of the stick is applied against the end of the slide furthest from the end wall, and pushing on the stick toward the end wall will cause the slide 64 to be positioned as desired. The operator will position the slide far enough "into" the load wherein he will hear an audible "click" or "snap" as the slide passes an abutment lever which will pivot from the position of FIG. 5 to that of FIG. 4. Thereupon, the straps 80 may be tensioned by means of the member 82.

It will be appreciated that the above-described operation permits the "pulling" relationship with the straps 80 even though the slides 64 are not positioned until the cargo space is completely loaded.

The components of the cargo control system above-described are of an economical nature and may be readily manufactured with conventional equipment. The cargo control system is of a relatively light weight and, due to the flexible nature of the straps 80, is readily adaptable to all sizes and shapes of cargo. The ease of positioning the slides 64 makes the system most versatile, and the positive locking relationship between the abutment levers 54 and the slides 64 insures dependable operation.

It is appreciated that modifications to the described embodiment may be apparent to those skilled in the art without departing from the spirit and scope thereof, and it is intended that the invention be defined only by the following claims.

I claim:

1. A cargo control system for cargo carriers defined by a pair of opposed side walls and an end wall comprising, in combination,
    (a) an elongated track mounted on each of said side walls in substantially parallel relation, said tracks including opposed U-shaped portions and an elongated opening defined intermediate said portions, the openings of said tracks being in opposed relation,
    (b) a slide reciprocably received within said U-shaped portions of each of said tracks and wholly confined within the configuration thereof,
    (c) a plurality of abutments longitudinally spaced along the length of each of said tracks, and mounted thereon, said abutments including an abutment surface disposed toward the end wall and preventing movement of said slides in a direction away from said end wall when engaging a slide,
    (d) means supporting said abutments permitting selective movement of said abutments into and out of the path of movement of the associated slide, said means normally maintaining said abutments within the path of movement of the associated slide and permitting the associated slide to remove the abutment from its path of movement on engagement thereby when being moved toward the end wall,
    (e) a flexible tension-transmitting member affixed to each of said slides and extending from the associated elongated opening defined on said tracks, and
    (f) tension-creating means interconnecting said tension-transmitting members adapted to tension said members and confine cargo between said end and side walls and said tension members.

2. In a cargo control system for cargo carriers as in claim 1, wherein
    (a) said abutments include a plurality of levers pivotally mounted upon each of said tracks within a U-shaped portion thereof, said levers being so shaped as to pivot out of the path of said slides upon engagement with a slide during slide movement toward said end wall, and abuttingly engage the associated slide during movement thereof away from said end wall.

3. In a cargo control system for cargo carriers as in claim 2, wherein
    (a) a spring is associated with each lever biasing each lever into the path of the associated slide.

References Cited by the Examiner

UNITED STATES PATENTS

| | | | |
|---|---|---|---|
| 994,822 | 6/1911 | Daly | 105—369 |
| 1,020,650 | 3/1912 | Kenney | 280—179.1 |
| 2,827,000 | 3/1958 | Tobin | 105—369 |

OTHER REFERENCES

The "Self-Tensioning Tie-Down" disclosed on page 86 of the August 1960 issue of Modern Railroads.

ARTHUR L. LA POINT, *Primary Examiner.*

LEO QUACKENBUSH, *Examiner.*